G. HAVELL & A. G. WILLIAMS.
Extensible Fan.
No. 222,494. Patented Dec. 9, 1879.
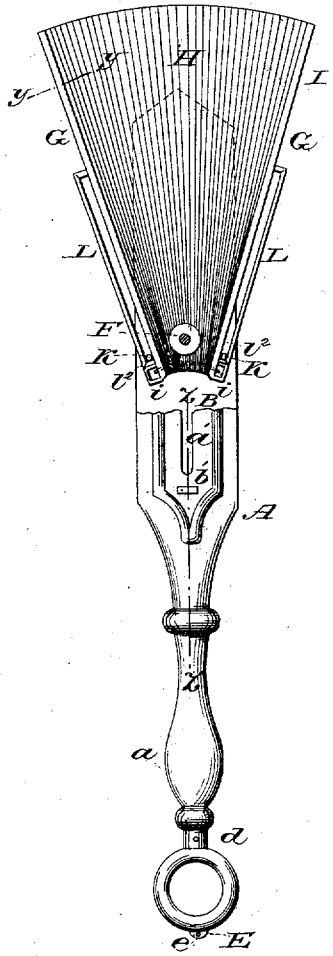
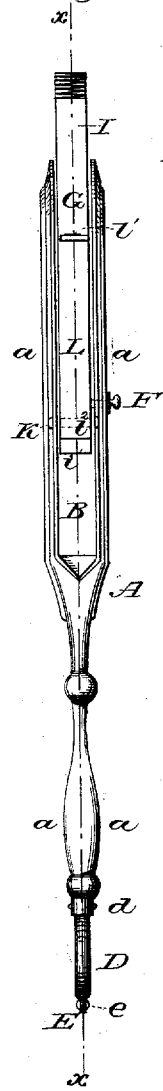
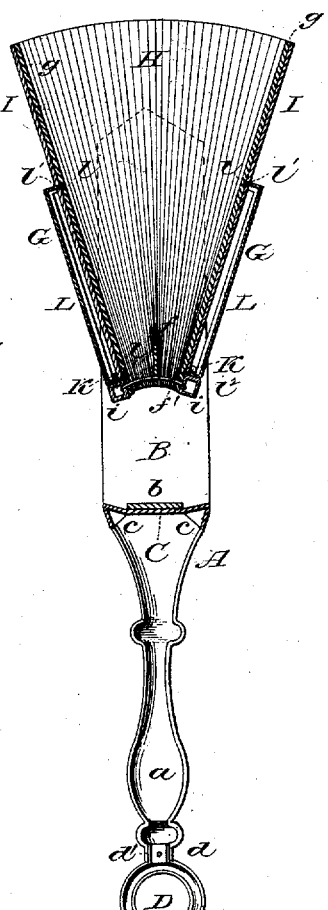
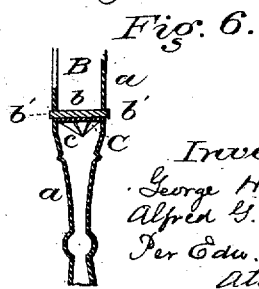

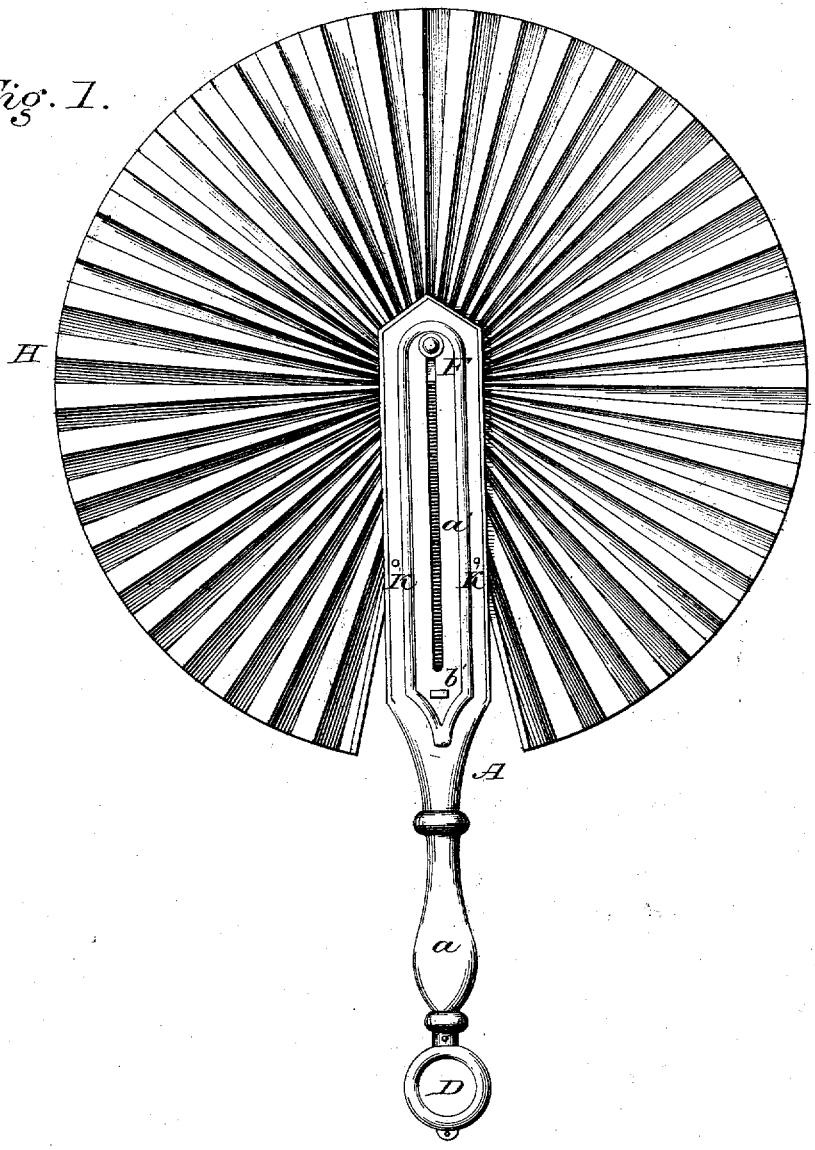

UNITED STATES PATENT OFFICE.

GEORGE HAVELL AND ALFRED G. WILLIAMS, OF NEWARK, NEW JERSEY.

IMPROVEMENT IN EXTENSIBLE FANS.

Specification forming part of Letters Patent No. 222,494, dated December 9, 1879; application filed October 6, 1879.

*To all whom it may concern:*

Be it known that we, GEORGE HAVELL and ALFRED G. WILLIAMS, of Newark, New Jersey, have invented certain Improvements in Extensible Fans, of which the following is a specification.

Our improvements relate to that class of extensible fans described in our application for a patent for suitably stamped and corrugated sheet-metal handles for extensible fans, filed April 28, 1879; and our invention consists, first, in constructing the two side pieces or levers of the fan of strips of metal respectively having their edges folded longitudinally for lapping one of the end folds of the fabric of which the folding part or leaf of the fan is made, or for embracing the light strips of wood upon which the end folds of the fabric may be respectively cemented; and, secondly, in providing each side lever with a slotted bearing for its fulcrum-pin by affixing to the outer face of the lever a short strip of sheet metal, the sides of which are strengthened by being curved to form beaded edges, and the ends of which are bent at a right angle and formed into tongues, which are respectively inserted and fastened in seats cut in the face of the lever.

In the accompanying drawings, representing an extensible fan embodying our invention, Figure 1 is a front view of the fan fully distended. Fig. 2 is a similar view of the fan partially distended, and having a portion of one-half of the slotted handle removed for the purpose of fully exhibiting the relation of the side levers to their fulcrum-pins. Fig. 3 is a side view of the fan in the position shown in Fig. 2. Fig. 4 is a longitudinal section of the fan through the line $x\,x$ on Fig. 3. Fig. 5 is a transverse section of one of the side pieces and several of the superposed folds of the fan, on an enlarged scale, through the line $y\,y$ on Fig. 2. Fig. 6 is a central longitudinal section of a portion of the handle through the line $z\,z$ on Fig. 2.

The handle A of our fan is composed mainly of two similarly stamped and corrugated pieces of sheet metal, $a\,a$, brazed, riveted, or otherwise secured together at their edges for about one-half of their length, and having their remaining portions so offset as to form the two parallel walls of a chamber, B, open at the top and on two sides, of suitable dimensions to receive the side pieces and the superposed folds of the fan when fully closed.

At the bottom of the chamber B we introduce a stretching-plate, $b$, provided upon each of its opposite sides with one or more tongues, $b'$, which are inserted in suitable apertures in the two pieces $a\,a$ of the handle, and upset on their outer ends to act as rivets.

In addition to the stretching-plate $b$ we may also insert another plate, C, either immediately above or immediately below the stretching-plate $b$, having its ends $c$ bent downward, and cut or bent to fit the lower boundary of the chamber B on either side.

It will, of course, be understood that the plate C may be provided with lateral tongues, like the tongues $b'$ of the stretching-plate $b$, and may be thus be made to serve the same purpose as the stretching-plate $b$, which may, in such case, be dispensed with.

In the drawings, the eye D on the end of the handle of the fan is represented as being constructed of two curved annular pieces of sheet metal, each provided with a radial projection, which, when placed together, form the stem $d$, which is inserted in the end of the handle A, and secured therein by the rivet $d'$. Opposite the stem $d$ each half of the eye is provided with a projecting flange, E, and the two flanges are secured together by the rivet $e$.

The handle may, of course, be made of a single suitably stamped and corrugated strip of sheet metal, doubled upon itself; but as a matter of economy it will be found preferable to construct the handle of the two pieces $a\,a$, and secure them together by brazing or riveting, substantially as herein shown and described.

One of the side pieces, $a$, is provided with the usual slot $a'$, for receiving the usual distending-pin F, and permitting its movement for the purpose of opening or closing the fan. The distending-pin F is affixed to the metallic plate $f$, which is inserted between the central pair of the superposed folds of the fan, and at its inner end is perforated to admit of the passage of the cord $f'$, which is stretched across from the inner end of one of the side levers, G, to the other through the superposed folds of the fabric.

The side levers, G, are each formed preferably of a light strip of wood, $g$, to which is cemented one of the outer folds, $g'$, of the fabric composing the leaf H of the fan. The wooden strip $g$ is re-enforced by a strip of sheet metal, I, the sides of which are folded inward and embrace the opposite edges of the wooden strip. At its inner end the re-enforcing-strip I is perforated to admit the cord $f'$, and the re-enforcing-strip is made enough longer than the wooden strip at its inner end to allow of its being bent upward, backward, and downward to form a cover, $i$, for that portion of the side piece through which the cord $f'$ is inserted.

The two side pieces are provided with the usual slots for the reception, respectively, of the fulcrum-pins K K, which are transversely secured in the two pieces $a\ a$ of the handle, and which, respectively, bear upon the outer faces of the re-enforcing-strips I I.

The outer wall of each fulcrum-pin slot is formed by the application to each side piece of a strip of sheet metal, L, having its sides curved inward to form beaded edges and to stiffen it, and having each end bent inward at right angles and formed into a tongue, $l$, which is inserted through a transverse slot, $l'$, in the strip I, and bent at a right angle against the inner surface thereof, as shown in Fig. 4. The inner end, $l^2$, of the piece L forms the ultimate bearing for the fulcrum-pin when the fan is being distended.

We do not herein claim a handle for an extensible fan composed of two sheet-metal halves, $a\ a$, stamped, corrugated, and united together as shown, as we have fully described and claimed such handles in our application for a patent filed April 28, 1879; but What we herein claim as our invention is—

1. In an extensible fan-handle, substantially such as described, a metallic plate brazed or riveted to the handle, and forming the bottom of the chamber B in the forked end of the handle, substantially as shown and described.

2. In combination with the pieces $a\ a$, the stretching-plate $b$, provided with the tongues $b'$, substantially as and for the purpose described.

3. The side pieces or levers of an extensible fan, composed of the sheet-metal strips I, having their sides folded down upon and partially inclosing, respectively, one of the outermost folds of the fabric of which the leaf of the fan is composed, substantially as shown and described.

4. The re-enforcing-strip I, provided upon its inner end with a prolongation forming the cover $i$, substantially as and for the purpose set forth.

5. In combination with the re-enforcing-strip of sheet metal I, the strip of sheet metal L, secured to the re-enforcing-strip I substantially in the manner shown, and forming the outer wall of the slotted bearing for the fulcrum-pin K, substantially as described.

GEORGE HAVELL.
ALFRED G. WILLIAMS.

Witnesses:
JOHN OTTO,
LOUIS FLEMMINGER.